US009369188B2

United States Patent
Li et al.

(10) Patent No.: US 9,369,188 B2
(45) Date of Patent: Jun. 14, 2016

(54) LINK PREDICTION BASED RE-BEAMFORMING TRIGGERING ALGORITHM FOR 60 GHZ COMMUNICATION LINKS

(75) Inventors: Guoqing Li, Portland, OR (US); Dmitry Akhmetov, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 163 days.

(21) Appl. No.: 13/993,196

(22) PCT Filed: Dec. 13, 2011

(86) PCT No.: PCT/US2011/064631
§ 371 (c)(1),
(2), (4) Date: Jun. 11, 2013

(87) PCT Pub. No.: WO2013/089681
PCT Pub. Date: Jun. 20, 2013

(65) Prior Publication Data
US 2014/0016495 A1    Jan. 16, 2014

(51) Int. Cl.
*H04B 7/06* (2006.01)
*H04B 7/04* (2006.01)

(52) U.S. Cl.
CPC ............ *H04B 7/0408* (2013.01); *H04B 7/0617* (2013.01)

(58) Field of Classification Search
CPC ............................ H04B 7/0408; H04B 7/0617
USPC .................................................. 370/332, 334
See application file for complete search history.

(56) References Cited

U.S. PATENT DOCUMENTS

2002/0039912 A1    4/2002    Yamaguchi et al.
2003/0119559 A1    6/2003    Chitrapu
(Continued)

FOREIGN PATENT DOCUMENTS

WO    2013/089679 A1    6/2013
WO    2013/089681 A1    6/2013

OTHER PUBLICATIONS

Lakshmanan et al., "Practical Beamforming Based on RSSI Measurements using Off-the-shelf Wireless Clients", Proceedings of the 9th ACM SIGCOMM conference on Internet measurement, Nov. 4-6, 2009, pp. 410-416.

(Continued)

*Primary Examiner* — Jeffrey M Rutkowski
*Assistant Examiner* — Ning Li
(74) *Attorney, Agent, or Firm* — Ellis B. Ramirez; Prass LLP

(57) ABSTRACT

A system and method are provided to trigger re-beamforming based on an algorithm that assesses various link characteristics. The algorithm is based on the ability of a 60 GHz receiving device to track and feedback a Received Signal Strength Indication (RSSI) to a 60 GHz data packet transmitter. By automatically analyzing RSSI values across a range of data packets, including consecutive data packets, a link degradation trend is predicted. When link degradation crosses, or is predicted to cross, a predetermined threshold, re-beamforming is triggered by the algorithm. Variables in the algorithm and the predetermined thresholds used by the algorithm can be automatically or manually modified to maintain a balance between appropriately triggering the re-beamforming when the conditions arise without unnecessarily triggering the re-beamforming thereby causing unneeded interruptions in regular data flow.

14 Claims, 3 Drawing Sheets

(56) References Cited

U.S. PATENT DOCUMENTS

| | | | |
|---|---|---|---|
| 2005/0202859 A1 | 9/2005 | Johnson et al. | |
| 2006/0073850 A1 | 4/2006 | Cha et al. | |
| 2006/0171357 A1 | 8/2006 | King et al. | |
| 2008/0081588 A1* | 4/2008 | Rofougaran | H04B 1/109 455/272 |
| 2008/0095072 A1 | 4/2008 | Shao et al. | |
| 2008/0172588 A1* | 7/2008 | Olgaard | 714/742 |
| 2008/0267150 A1 | 10/2008 | Rofougaran | |
| 2009/0097395 A1* | 4/2009 | Zhang et al. | 370/203 |
| 2009/0227249 A1* | 9/2009 | Ylitalo | 455/424 |
| 2010/0159844 A1* | 6/2010 | Yamazaki | H01Q 3/2605 455/69 |
| 2010/0172425 A1* | 7/2010 | Pare et al. | 375/260 |
| 2011/0033015 A1 | 2/2011 | Park et al. | |
| 2011/0159821 A1* | 6/2011 | Park | 455/69 |
| 2011/0222616 A1* | 9/2011 | Jiang et al. | 375/260 |
| 2013/0035051 A1* | 2/2013 | Mujtaba et al. | 455/277.2 |
| 2013/0044695 A1* | 2/2013 | Xu | H04B 7/0619 370/329 |

OTHER PUBLICATIONS

Mast, A.W., "Electronic Antenna Calibration System and Measurements for Compensating Real-Time Dynamic Distortions", 2010 IEEE Aerospace Conference, Mar. 6-13, 2010, 1 pages. (Only Abstract submitted).

International Preliminary Report on Patentability and Written Opinion received for PCT Patent Application No. PCT/US2011/064609, mailed on Jun. 26, 2014, 5 pages.

International Search Report and Written Opinion received for PCT Patent Application No. PCT/US2011/064609, mailed on Jun. 28, 2012, 9 pages.

International Preliminary Report on Patentability and Written Opinion received for PCT Patent Application No. PCT/US2011/064631, mailed on Jun. 26, 2014, 6 pages.

International Search Report and Written Opinion received for PCT Patent Application No. PCT/US2011/064631, mailed on Jun. 28, 2012, 9 pages.

\* cited by examiner

LINK PREDICTION BASED RE-BEAMFORMING TRIGGERING ALGORITHM FOR 60 GHZ COMMUNICATION LINKS

This application is related to U.S. patent application Ser. No. 13/993,203 titled "BEAMFORMING BASED ON INFORMATION FROM PLATFORM SENSORS" filed on May 12, 2014, and filed on the same day as this application as PCT International Application PCT/US2011/064609.

BACKGROUND

1. Field of the Disclosed Embodiments

This disclosure relates to systems and methods for employing a link prediction algorithm for intelligently triggering re-beamforming for a 60 GHz communication link.

2. Related Art

Before 2000, wireless telecommunication services were generally confined to the range of 2 to 30 GHz. An increasing demand for bandwidth, however, demonstrated the inadequacy of the traditional microwave frequency allocation. The wireless industry, more than a decade ago began to focus on the millimeter wave (MMW) frequency region of the electromagnetic spectrum between 30 GHz and 300 GHz to expand communication capacity. In 2001, the Federal Communications Commission (FCC) set aside a continuous block of 7 GHz of spectrum between 57 and 64 GHz for "unlicensed" wireless communications.

The 60 GHz MMW region of the spectrum became a focus of study based its unique characteristics. Wireless communications in the 60 GHz frequency range experience a high level of atmospheric radio frequency (RF) energy absorption. For many years, the intelligence community had operated wireless systems at 60 GHz because this high level of atmospheric absorption attenuates the transmitted signal over distance, allowing the signals to be very focused. Based on the years of use, the characteristics of this frequency range were well known and well documented. Understanding that the transmitted RF energy in this frequency region would be quickly absorbed by oxygen molecules in the atmosphere over long distances, wireless technology developers began to focus on this characteristic as a benefit for certain applications.

Previously, the high levels of atmospheric absorption and resultant range limitations were viewed as rendering MMW technologies unsuitable for certain wireless applications. As there emerged a need for short-range, focused and potentially secure transmission paths, however, MMW technologies, and particularly 60 GHz MMW systems, were viewed as presenting possible solutions worthy of further study. The unique characteristic of limited energy propagation in an oxygen atmosphere for transmissions in the 60 GHz band was found to present significant benefits such as increased immunity to interference for transmitter/receiver systems in comparatively close proximity to one another leading to a greater degree of potential frequency re-use in a local environment.

Transmitting in the 60 GHz wavelength range results in a fairly focused beam as compared to transmitting in lower frequency ranges. It is this pencil beam transmission capability combined with high energy absorption outside the narrow transmission beam that provides the unique ability to reuse a same frequency in a comparatively localized region making it possible to operate multiple transmitter and receiver combinations on the same frequency in close proximity to one another with very low likelihood of interference.

Another benefit of the use of MMW frequencies lies in the relationship between signal wavelength and antenna size. Transmitters and receivers operating in the MMW region use high-gain antennas to focus as much of the transmitted signal as possible onto the receiving antenna, thereby overcoming the effects of atmospheric absorption in the pencil beam between the transmitter and the receiver. Those of skill in the art recognize that, with an increase in RIP frequency, wavelength decreases. This makes it possible to produce required gains with smaller antennas. Thus, at 60 GHz, a very compact, low-cost antenna can be used to achieve a highly focused beam. This architecture results in the emissions from the MMW system via a high-gain/narrow beam antenna being very narrow and focused. Directivity is a measure of how well an antenna focuses its energy in an intended direction. Point-to-point radios should have highly directional antennas in order that all the transmitted energy is directed just at the intended recipient. Highly focused antennas minimize the possibility of interference, minimize the risk that the transmission will be intercepted, and maximize performance. These all were found to be tremendous advantages in the employment of the 60 GHz frequency range for wireless communication.

Against the backdrop of the above advantages, 60 GHz MMW communication suffers from certain shortfalls based on the above-discussed characteristics as well. Among these shortfalls is that 60 GHz communication is, by its very nature, highly susceptible to human blockage. Further, because the 60 GHz transmission beam is so narrowly focused for directional transmission, it is very vulnerable to device movement and rotation. Either of these occurrences can result in significant link degradation. As a result, mechanisms to cope with link degradation due to blockage and/or device movement become of critical importance in sustaining robust 60 GHz communication links.

Among the conventional methods for dealing with link degradation in a 60 GHz link is to employ Modulation Code Scheming (MCS) adaptation using various radio technologies. While MCS adaptation can cope with many issues regarding link degradation, it does not necessarily aid in maintaining optimal link performance in the event of occurrences such as device rotational or translational movement. In these instances, the directional beam of the 60 GHz link may fall completely off the communicating peer device's reception beam. A better strategy for dealing with these occurrences is to perform re-beamforming to find a stronger communication path.

Those of skill in the art recognize that the term "beamforming" refers to a class of well-known signal processing techniques used in certain antenna arrays for manipulating directional signal transmission or reception. One technique is to combine elements in the particular antenna array in a way that signals at particular angles experience constructive interference, while other signals experience destructive interference. Beamforming, therefore, takes advantage of interference to change the directionality of the array. Beamforming can be used at both the transmitting and receiving ends in order to achieve spatial selectivity.

Re-beamforming is a process that can be used to strengthen a weakening communication link, or otherwise to re-establish a broken communication link.

SUMMARY OF THE DISCLOSED EMBODIMENTS

An objective of performing re-beamforming in a 60 GHz communication link lies in finding an intelligent triggering mechanism to trigger the re-beamforming quickly, but only at appropriate times. While performing re-beamforming, the data flow along the 60 GHz communication link may have to be completely interrupted. Such an interruption can lead to delay and reduced throughput. Therefore, there exists a tradeoff in developing an intelligent strategy for triggering re-beamforming to cope with link degradation while minimizing the impact on the regular data flow.

In various exemplary embodiments, the systems and methods according to this disclosure may provide an intelligent re-beamforming strategy that meets the objectives of the above tradeoff.

In various exemplary embodiments, the systems and methods according to this disclosure may provide a re-beamforming triggering algorithm that assesses various link characteristics to trigger the re-beamforming.

In various exemplary embodiments, the systems and methods according to this disclosure may provide an exemplary link prediction based re-beamforming algorithm. The algorithm may be based on the ability of a 60 GHz receiving device to track and feedback a Received Signal Strength Indication (RSSI) to a 60 GHz packet transmitter. By automatically analyzing RSSI values across a range of data packets, including consecutive data packets, a link degradation trend may be predicted. When link degradation crosses, or is predicted to cross, a predetermined threshold, re-beamforming may be triggered properly by the algorithm.

In various exemplary embodiments, the systems and methods according to this disclosure may allow variables in the algorithm and the predetermined thresholds to be automatically or manually modified to maintain a balance between appropriately triggering the re-beamforming when the conditions arise without unnecessarily triggering the re-beamforming thereby causing unneeded interruptions in regular data flow.

These and other features, and advantages, of the disclosed systems and methods are described in, or apparent from, the following detailed description of various exemplary embodiments.

BRIEF DESCRIPTION OF THE DRAWINGS

Various exemplary embodiments of the disclosed systems and methods for employing a link prediction algorithm for intelligently triggering re-beamforming for a 60 GHz communication link will be described, in detail, with reference to the following drawings, in which.

DETAILED DESCRIPTION OF THE DISCLOSED EMBODIMENTS

The systems and methods for employing a link prediction algorithm for intelligently triggering re-beamforming for a 60 GHz communication link according to this disclosure will generally refer to this specific utility for those systems and methods. Exemplary embodiments described and depicted in this disclosure should not be interpreted as being specifically limited to any particular configuration, or directed to any particular intended use. In fact, any re-beamforming strategy for maintaining a wireless communication link traversing a pencil beam between cooperating communication devices, i.e., transmitter/receivers, or for otherwise intelligently triggering re-beamforming by using algorithms that compare measured signal strength information to a pre-set or predetermined threshold is contemplated.

Specific reference to, for example, any particular communication device, including specifically cooperating wireless communicating devices operating in the 60 GHz frequency range, should be understood as being exemplary only, and not limiting, in any manner, to any particular class of devices. The systems and methods according to this disclosure will be described as being particularly adaptable the above-described function, but should not be considered as being limited to only these functions.

Individual features and advantages of the disclosed systems and methods will be set forth in the description that follows, and will be, in part, obvious from the description, or may be learned by practice of the features described in this disclosure. The features and advantages of the systems and methods according to this disclosure may be realized and obtained by means of the individual elements and method steps, and combinations of those elements and method steps, as particularly pointed out in the appended claims. While specific implementations are discussed, it should be understood that this is done for illustration purposes only. A person skilled in the relevant art will recognize that other components and configurations may be used without departing from the spirit and scope of the subject matter of this disclosure.

Various aspects of the disclosed embodiments relate to a system and a method for employing a link prediction algorithm for intelligently triggering re-beamforming for a 60 GHz communication link, as well as a corresponding non-transitory computer-readable medium having recorded on it a program that, when executed by a processor causes the processor to execute the steps of the method for employing a link prediction algorithm for intelligently triggering re-beamforming for a 60 GHz communication link.

Figure 1:
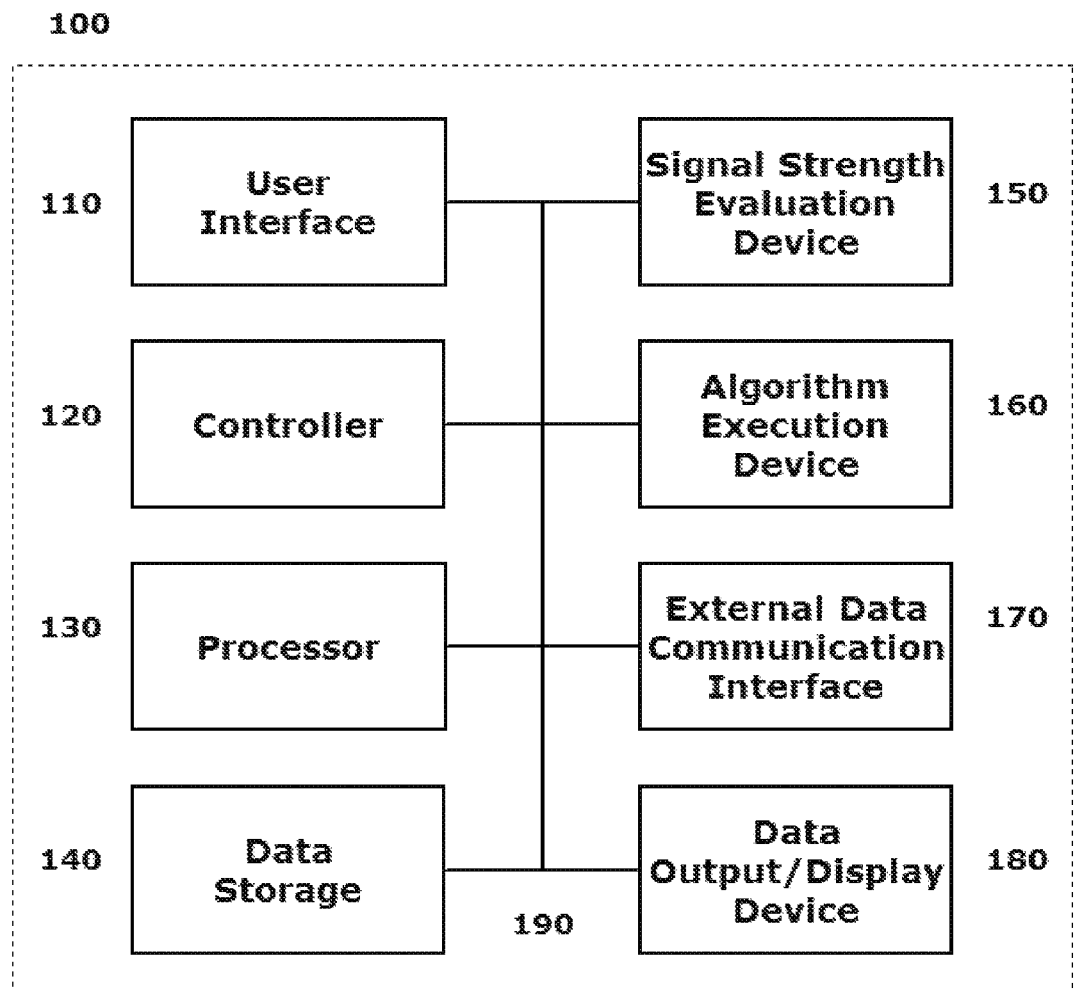
FIG. 1 illustrates a block diagram of an exemplary system for employing a link prediction algorithm for intelligently triggering re-beamforming for a 60 GHz communication link according to this disclosure.

FIG. 1 illustrates a block diagram of an exemplary system 100 for employing a link prediction algorithm for intelligently triggering re-beamforming for a 60 GHz communication link according to this disclosure. The exemplary system 100 may be in either of a transmitter or a receiver or both in a 60 GHz communication link.

The system 100 may include a user interface 110 by which a user can communicate with the system 100. The user interface 110 may be configured as any one or more conventional mechanisms that permit a user to input information to the system 100. The user interface 110 may include, for example, an integral or attached keyboard and/mouse, or a touchscreen with "soft" buttons. The user interface 110 may alternatively include a microphone by which a user may provide oral commands to the system 100 to be "translated" by a voice recognition program or otherwise. The user interface 110 may otherwise include any other like device for user operation of, and data exchange with, the system 100.

The user interface 110 may provide a user of the system 100 an opportunity to activate the system 100 and also to manually enter, to set or to reset certain predetermined thresholds to be used by the link prediction algorithm, as will be discussed in greater detail below.

The system 100 may include a controller 120 for controlling operation of the system 100, and one or more local processors 130 for individually undertaking determination processes that are carried out by the system 100. The controller 120 and the processor(s) 130 may cooperate to carry out the processing and control functions for employing a link prediction algorithm for intelligently triggering re-beamforming for the 60 GHz communication link of which the system 100 is a part. Processor(s) 130 may include at least one conventional processor or microprocessor that interprets and implements instructions to execute the algorithms, and makes the determinations according to the methods of this disclosure.

The system 100 may include one or more data storage devices 140. Such data storage device(s) 140 may be used to store data or operating programs to be used by the system 100, and specifically the controller 120 and the processor 130. Data storage device(s) 140 may include a random access memory (RAM) or another type of dynamic storage device that stores information and instructions for execution by the controller 120 and the processor(s) 130. Data storage device(s) 140 may also include a read-only memory (ROM), which may include a conventional ROM device or another type of static storage device that stores static information and instructions for the controller 120 and the processor(s) 130. The data storage device(s) 140 may be provided as integral components of the system 100, or otherwise may be provided external to, and in wireless communication with, the system 100.

At least one data storage device 140 may be configured to store the link prediction algorithms according to this disclosure for intelligently triggering the re-beamforming for the communication link as will be described in greater detail in the discussion of the method below.

The system 100 may include at least one signal strength evaluation device 150. The signal strength evaluation device 150 may be capable of tracking and obtaining feedback regarding a Received Signal Strength Indication or RSSI for each packet transmitted between transmission and receiving nodes of, for example, the 60 GHz communication link that is monitored and acted upon by the system 100. The signal strength evaluation device 150 may record and store in, for example, one or more data storage devices 140, values indicative of an RSSI for each transmitted or received packet.

The system 100 may also include an algorithm execution device 160. The algorithm execution device 160 may be a standalone component of the system 100, or otherwise, the functions of an algorithmic execution device 1160 may be undertaken by the processor 130 of the system 100. Regardless of the precise structural composition of the algorithm execution device 160, it is this device that executes the link prediction algorithm for intelligently triggering re-beamforming in the communication link with the system 100.

As indicated above, the algorithms are based on the fact that the communication link can provide to the system 100, via the signal strength evaluation device 160, or otherwise, an ability to track and feedback RSSI for each packet to the system 100. Based on the information provided, the algorithm execution device 160 may execute algorithms according to the following description.

The signal strength evaluation device 150 may track and record, as RSSI (i), the signal strength measured against packet (i) for each packet (i). The signal strength evaluation device 150 may obtain RSSI(i) through any one of a number of conventional means including, for example, feedback from the receiver of the data packet, or otherwise through transmitter monitoring signals such as ACK and/or block ACK, with a presumption of reciprocity. Those skilled in the art recognize, however, that the reciprocity presumption may not always be true. As such, the more reliable manner of obtaining RSSI(i) is through feedback from the receiver of the data packets (i), if available.

The algorithm execution device 160 may then compute ΔRSSI(i) for consecutive data packets (i−1) and (i) according to the following Equation 1:

$$\Delta RSSI(i) = RSSI(i) - RSSI(i-1) \qquad \text{Equation 1}$$

The algorithm execution device 160, or separately the processor 130, may obtain a predetermined or otherwise preset threshold −ΔRSSI(fast) and compare ΔRSSI(i) to the threshold to determine whether ΔRSSI(i) is less than the −ΔRSSI(fast) threshold. In instances where the algorithm execution device 160, or the processor 130, determine that ΔRSSI(i) is less than the −ΔRSSI(fast) threshold, the system 100 may trigger re-beamforming. Execution by the algorithm execution device 160, or the processor 130, according to these steps may enable intelligent re-beamforming for communication links that are degrading rapidly or catastrophically, i.e., where the communication link is experiencing large RSSI drops between data packets. It should be noted that rarely will it be considered prudent to trigger re-beamforming based on a single ΔRSSI(i) value falling below the −ΔRSSI(fast) threshold. Those of skill in the art recognize that RSSI values fluctuate. As such, the algorithm execution device 160, or the processor 130, may repeat the ΔRSSI(i) calculation and comparison to the −ΔRSSI(fast) threshold across a number N of packet (i) measurements. In such a circumstance, if ΔRSSI(i) is determined to be less than the −ΔRSSI(fast) threshold for consecutive N packet pairs, only then will the algorithm execution device 160, or the processor 1130, cause the system 100 to trigger re-beamforming.

The algorithm execution device 160 may separately compute ΔRSSI(M) for a number of data packets M according to the following Equation 2:

$$\Delta RSSI(M) = RSSI(i+M) - RSSI(i) \qquad \text{Equation 2}$$

The algorithm execution device 160, or separately the processor 130, may obtain a predetermined or otherwise preset threshold −ΔRSSI(slow) and compare ΔRSSI(M) to the threshold to determine whether ΔRSSI(M) is less than the −ΔRSSI(slow) threshold. In instances where the algorithm execution device 160, or the processor 130, determine that ΔRSSI(M) is less than the −ΔRSSI(slow) threshold, the system 100 may trigger re-beamforming. Execution by the algorithm execution device 160, or the processor 130, according to these steps may enable intelligent re-beamforming for communication links that are degrading more slowly or insidiously, i.e., where the communication link is not experiencing large RSSI drops between data packets, but the slow degradation will prove catastrophic over more than M data packets. Based on the insidious nature of this degradation, the focus for the algorithm execution device 160, or the processor 130, is across a range of M data packets.

The system 100 may execute either of the above-noted algorithms separately and individually, to include executing only one of the above-noted algorithms, or may execute both of the algorithms together, in parallel or in series, or in any combination.

Each of the −ΔRSSI(fast) and the −ΔRSSI(slow) thresholds, as well as the variables N and M may be independently settable and/or configurable automatically by the system 100, or manually in the system 100 by, for example, a user manipulating any of the parameters via the user interface 110. For example, if the −ΔRSSI(fast) threshold was initially set to 5 dB, and the N parameter was initially set at 3, then the first above-described algorithm may trigger re-beamforming if three consecutive data packets result in more than a 5 dB RSSI drop. A smaller −ΔRSSI(fast) threshold or a smaller N value would result in more aggressive re-beamforming, while a larger −ΔRSSI(fast) threshold or a larger N value would result in more conservative re-beamforming. As discussed above, the tradeoff is between executing an appropriate intelligent re-beamforming strategy, while minimizing the impact on regular data flow.

All the thresholds and N/M parameters are anticipated to be re-configurable during system 100 operation. The system 100 may, for example, separately monitor Packet Error Rate (PER) or other transmission quality parameters. If the monitored PER becomes too high, or the other monitored transmission quality parameters show evidence of link degradation, the system 100 may reduce the −ΔRSSI(fast) threshold or the N value in order that the system 100 performs re-beamforming more aggressively to cope with the link degradation.

The system 100 may include one or more external data communication interfaces 170 by which the system may communicate with and/or monitor the communication link. External data communication interface(s) 170 may include any mechanism that facilitates direct communication, or communication via a network environment, for collection of the above-described data, and sharing of results of processing undertaken by the system 100. External data communication interface(s) 170 may provide wired or wireless connectivity to the communication links that are being monitored. This provides an option for the system 100 to be internally mounted as an integral component of either of the transmitter or receiver that make up the communication link, or to be a separate standalone component in communication with one or both of the transmitter and receiver that make up the communication link.

One of the external data communication interface(s) 170 may be specifically configured as a receiver portal usable to detect and collect RSSI from the communication link for use by the system 100, and specifically to provide input to the signal strength evaluation device 150 of the system 100.

The system 100 may include at least one data output/display device 180 which may be configured as one or more conventional mechanisms that display information to the user of the system 100 for alerting the user, for example, to a triggering of re-beamforming in the communication link. The data output/display device 180 may also provide a connection by which the system 100 outputs a signal to the communication link to trigger re-beamforming in the communication link based on the execution of one or more of the above link prediction algorithms for intelligently triggering re-beamforming in the communication link.

All of the various components of the system 100, as depicted in FIG. 1, may be connected by one or more data/control busses 190. The data/control busse(s) 190 may provide internal wired or wireless communication between the various components of the system 100, whether all of those components are housed integrally as a single unit or are otherwise connected to and in communication with each other.

It should be appreciated that, although depicted in FIG. 1 as an integral unit, the various disclosed elements of the system 100 may be arranged in any combination of sub-systems as individual components or combinations of components, integral to a single unit, or external to, and in wired or wireless communication with the single unit. In other words, no specific configuration as an integral unit or as a support unit, for the system 100 is to be implied by the depiction in FIG. 1. Further, as noted above, the system 100 may be housed integrally within one or both ends of the communication link that the system 100 is intended to monitor and control for re-beamforming.

The disclosed embodiments may include a method for executing a link prediction algorithm for intelligently triggering re-beamforming for a 60 GHz communication link. The method may include setting one or more of a −ΔRSSI(fast) threshold and a −ΔRSSI(slow) threshold against which later-collected changes in RSSI values may be evaluated. The method may monitor the transmission and/or reception of data packets across a communication link. The method may record Received Signal Strength Indications (RSSI) for each of the transmitted/received data packets. The method may compute a difference between RSSI values for consecutive data packets, or may compute a difference in RSSI values across a number of data packets to arrive at a ΔRSSI value. The method may compare the computed ΔRSSI value for consecutive data packets with the −ΔRSSI(fast) threshold, or may compare the computed ΔRSSI value across a range of M data packets with the −ΔRSSI(slow) threshold, to determine whether to trigger re-beamforming. In a case of computing a ΔRSSI value for consecutive data packets, the method may compute such values for a number N of pairs of consecutive data packets prior to triggering re-beamforming. The method may also evaluate characteristics of the communication link to deter nine whether the set thresholds are proper. In instances where it is determined that the set thresholds are not correct, the method may modify the thresholds appropriately. An objective of properly setting the thresholds is to attempt balance an intelligent strategy for triggering re-beamforming to cope with link degradation quickly while minimizing interruptions to regular data flow across the communication link.

Figure 2:
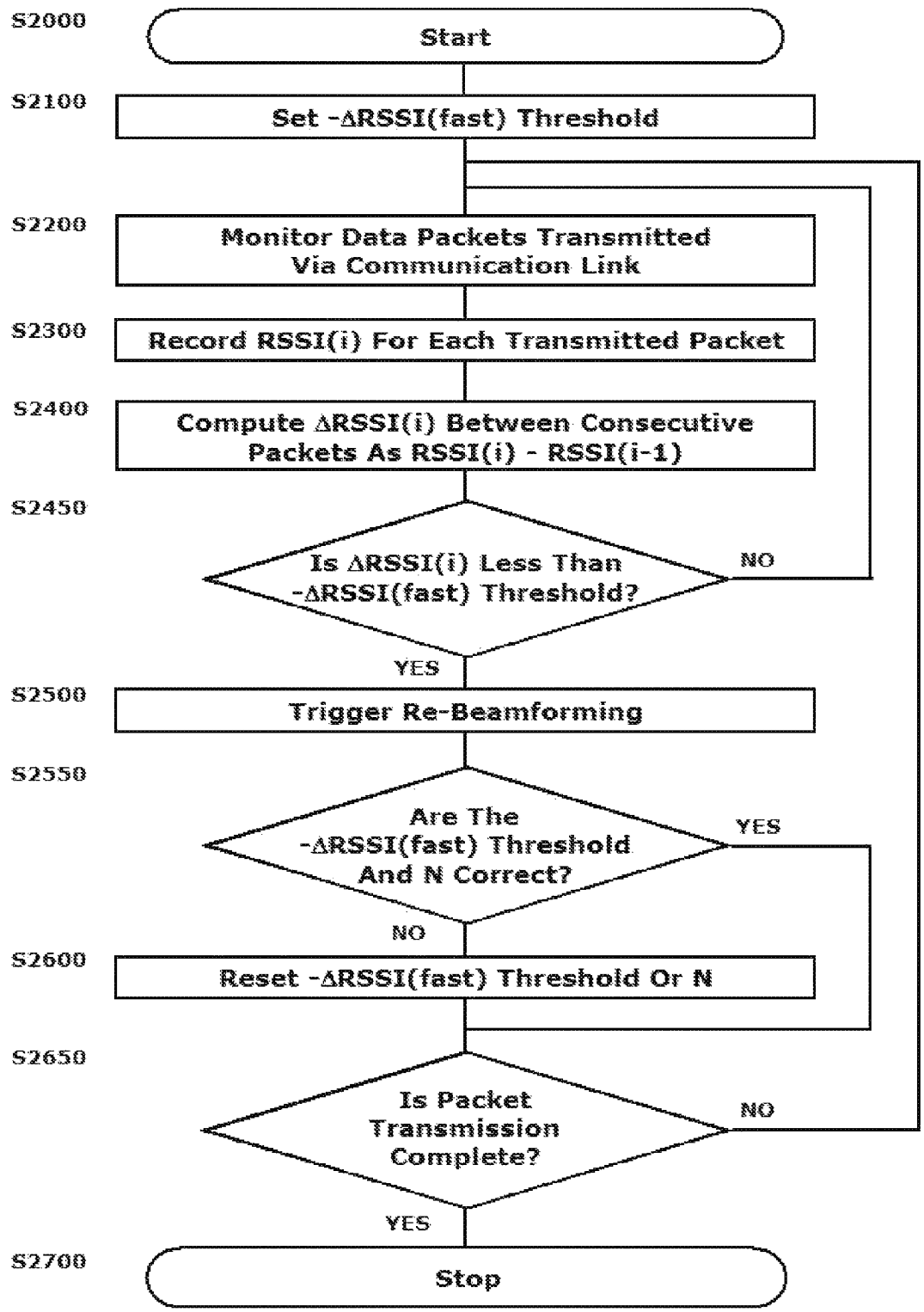
FIG. 2 illustrates a flowchart of a first exemplary method for employing a link prediction algorithm for intelligently triggering re-beamforming for a 60 GHz communication link according to this disclosure.

FIG. 2 illustrates a flowchart of a first exemplary method for employing a link prediction algorithm for intelligently triggering re-beamforming for a 60 GHz communication link according to this disclosure. As shown in FIG. 2, operation of the method commences at Step S2000 and proceeds to Step S2100.

In Step S2100, a predetermined threshold value −ΔRSSI (fast) may be set. The setting of this threshold value may comprise establishing a pre-determined threshold and storing it in a data storage device of a link degradation monitoring system. The setting of the threshold value may be otherwise based on some manual input from a user, or an automated input from a link degradation system based on Observed or monitored characteristics of the communication link. The setting of the threshold value should not be considered to be limited to any of these exemplary methods, however. Operation of the method proceeds to Step S2200.

In Step S2200, characteristics of individual data packets transmitted across the communication link may be monitored at either or both of the transmission and reception ends of the communication link. Operation of the method proceeds to Step S2300.

In Step S2300, a Received Signal Strength Indication or RSSI value for each packet (i) may be recorded as RSSI(i). As indicated above, any one of a number of conventional means for receiving, evaluating and recording an RSSI value associated with each packet may be employed. For example, the method may evaluate signal strength feedback from the receiver of the data packet, or otherwise may evaluate transmitter monitoring signals such as ACK and/or block ACK, with a presumption of reciprocity. As noted above, however, those skilled in the art recognize that the reciprocity presumption may not always be true. The more reliable manner of obtaining RSSI(i) values is through feedback from the receiver of the data packet (i), if available. Operation of the method proceeds to Step S2400.

In Step S2400, a ΔRSSI(i) value may be calculated according to Equation 1 above. Operation of the method proceeds to Step S2450.

Step S2450 is a determination step in which it is determined whether a calculated ΔRSSI(i) value falls below the set −ΔRSSI(fast) threshold value. If, in Step S2450, it is determined that the calculated ΔRSSI(i) value does not fall below the set −ΔRSSI(fast) threshold value, operation of the method may revert to Step S2200 for additional monitoring, or operation of the method may proceed to Step S2650, as discussed below.

If, in Step S2450, it is determined that the calculated ΔRSSI (i) value falls below the set −ΔRSSI(fast) threshold value, operation of the method proceeds to S2500.

In Step S2500, the method may trigger re-beamforming to enable intelligent re-beamforming for communication links that are degrading rapidly or catastrophically, i.e., where the communication link is experiencing large RSSI drops between data packets. It should be noted that rarely will it be considered prudent to trigger re-beamforming based on a single ΔRSSI(i) value falling below the −ΔRSSI(fast) threshold, as discussed above. As such, the method may repeat the ΔRSSI(i) calculation and comparison to the −ΔRSSI(fast) threshold of Steps S2300, 2400 and 2450 across a number N of packet (i) measurements. In such a circumstance, if ΔRSSI (i) is determined to be less than the −ΔRSSI(fast) threshold for consecutive N packet pairs, only then will the method trigger re-beamforming. Operation of the method proceeds to Step S2550.

Step S2550 is a determination step. In Step S2550, the method may determine whether either the −ΔRSSI(fast) threshold, or the N number, are chosen properly, i.e. are correct. If, in Step S2550, it is determined that the −ΔRSSI (fast) threshold, and the N number, are correct, operation of the method proceeds to Step S2650.

If, in Step S2550, it is determined that either the −ΔRSSI (fast) threshold, or the N number, are not correct, operation of the method proceeds to Step S2600.

In Step S2600, one or both of the −ΔRSSI(fast) threshold, or the N number, may be changed. See the discussion above concerning configuration of -ΔRSSI(slow) and ΔRSSI(fast) thresholds, variables N and M, and N/M parameter. Operation of the method proceeds to Step S2650.

Step S2650 is a determination step. In Step S2650, the method may determine whether the packet transmission across the communication link is complete. If, in Step S2650, it is determined that the packet transmission is not complete, operation of the method reverts to Step S2200.

If, in Step S2650, it is determined that the packet transmission is complete, operation of the method proceeds to step S2700 where operation of the method ceases.

Figure 3:
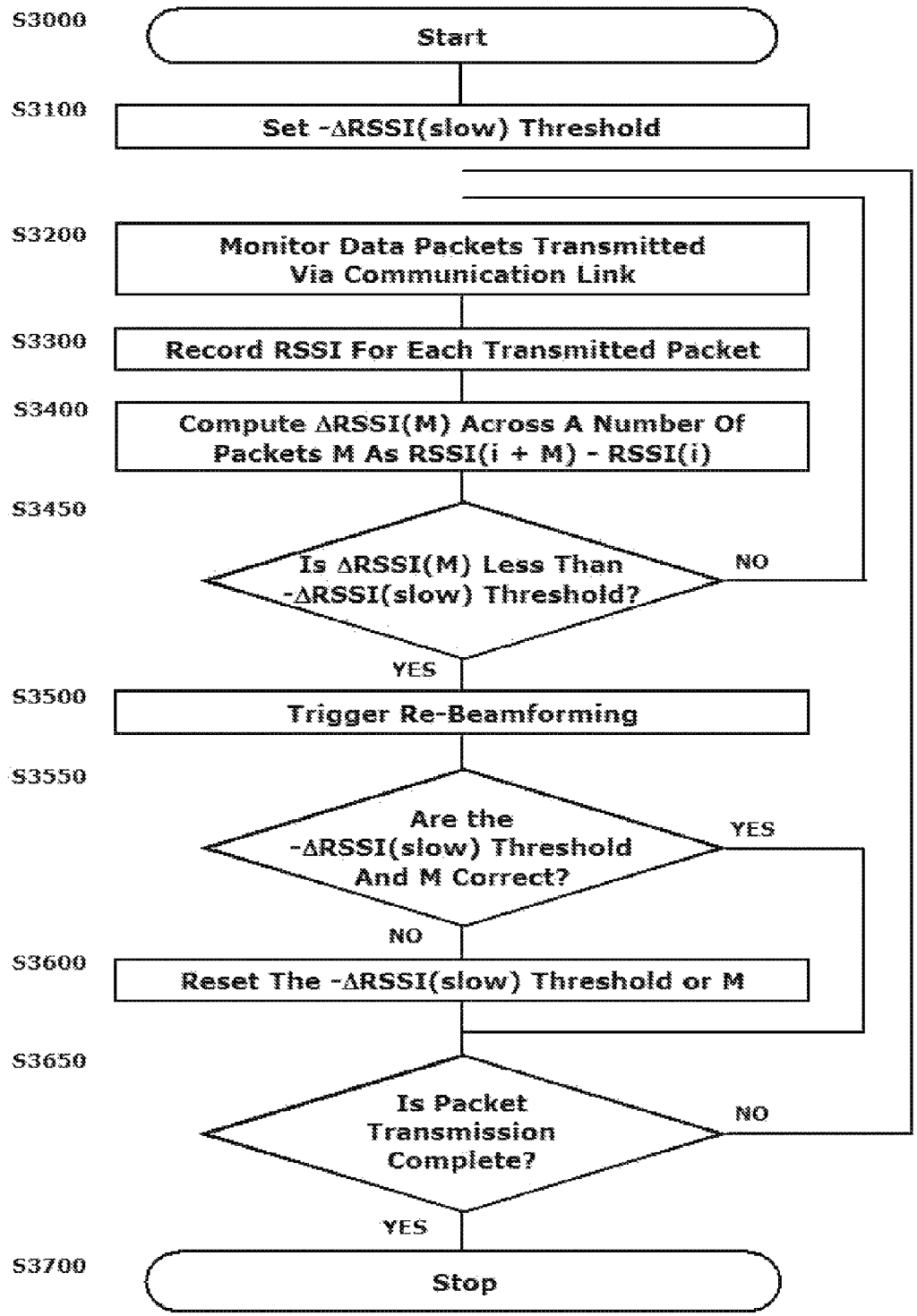
FIG. 3 illustrates a flowchart of a second exemplary method for employing a link prediction algorithm for intelligently triggering re-beamforming for a 60 GHz communication link according to this disclosure.

FIG. 3 illustrates a flowchart of a second exemplary method for employing a link prediction algorithm for intelligently triggering re-beamforming for a 60 GHz communication link according to this disclosure. As shown in FIG. 3, operation of the method commences at Step S3000 and proceeds to Step S3100.

In Step S3100, a predetermined threshold value −ΔRSSI (slow) may be set in the same manner as in Step S2100 of the previous exemplary embodiment. Operation of the method proceeds to Step S3200.

In Step S3200, characteristics of individual data packets transmitted across the communication link may be monitored in the same manner as in Step S2200 of the previous exemplary embodiment. Operation of the method proceeds to Step S3300.

In Step S3300, a Received Signal Strength Indication or RSSI value for each packet (i) may be recorded as RSSI(i) associated with that packet in the same manner as in Step S2300 of the previous exemplary embodiment. Operation of the method proceeds to Step 3400.

In Step S3400, a ΔRSSI(M) value may be calculated across M data packets according to Equation 2 above. Operation of the method proceeds to Step S3450.

Step S3450 is a determination step. In Step S3450, it is determined whether a calculated ΔRSSI(M) value falls below the set −ΔRSSI(slow) threshold value. If in Step S3450, it is determined that the calculated ΔRSSI(M) value does not fall below the set −ΔRSSI(slow) threshold value, operation of the method may revert to Step S3200 for additional monitoring, or operation of the method they proceed to Step S3650, as discussed below.

If, in Step S3450, it is determined that the calculated ΔRSSI (M) value falls below the set −ΔRSSI(slow) threshold value, operation of the method (proceeds to S3500.

In Step S3500, the method may trigger re-beamforming to enable intelligent re-beamforming for communication links that are degrading slowly or insidiously, i.e., where the communication link is not experiencing large RSSI drops between consecutive data packets, but rather is experiencing link degradation over M data packets. Operation of the method proceeds to Step S3550.

Step S3550 is a determination step. In Step S3550, the method may determine whether either the −ΔRSSI(slow) threshold, or the M number, are chosen properly, i.e. are correct. If, in Step S3550, it is determined that the −ΔRSSI (slow) threshold, and the M number, are correct, operation of the method proceeds to Step S3650.

If, in Step S3550, it is determined that either the −ΔRSSI (slow) threshold, or the M number, are not correct, operation of the method proceeds to Step S3600.

In Step S3600, one or both of the −ΔRSSI(slow) threshold, or the M number, may be changed. See the discussion above at Step S2600. Operation of the method proceeds to Step S3650.

Step S3650 is a determination step. In Step S3650, the method may determine whether the packet transmission across the communication link is complete. If, in Step S3650, it is determined that the packet transmission is not complete, operation of the method reverts to Step S3200.

If, in Step S3650, it is determined that the packet transmission is complete, operation of the method proceeds to step S3700 where operation of the method ceases.

As indicated above, both of these exemplary methods may be separately employed to monitor one or more communication links. The two exemplary methods may otherwise be employed in any combination in monitoring the one or more communication links.

The disclosed embodiments may include a non-transitory computer-readable medium storing instructions which, when executed by a processor, may cause the processor to execute the steps of either or both of the methods described in exemplary manner above.

The above-described exemplary systems and methods reference certain conventional computing and signal monitoring components to provide a brief, general description of a suitable communication and processing environment in which the subject matter of this disclosure may be implemented for familiarity and ease of understanding. Although not required, embodiments of the disclosure may be provided, at least in part, in a form of hardware circuits, firmware or software computer-executable instructions to carry out the specific functions described, such as program modules, being executed by a processor. Generally, program modules include routine programs, objects, components, data structures, and the like that perform particular tasks or implement particular data types.

Those skilled in the art will appreciate that other embodiments of the invention may be practiced in communication network environments with many types of communication equipment and computer system configurations, particularly in hand-held wireless devices, multi-processor systems, microprocessor-based or programmable consumer electronics, and the like.

Embodiments may also be practiced in distributed network communication environments where tasks are performed by local and remote processing devices, generally as outlined above, that are linked to each other by hardwired links, wireless links, or a combination of both through a communication network. In a distributed network environment, program modules may be located in both local and remote data storage devices.

Embodiments within the scope of the present disclosure may also include computer-readable media having stored computer-executable instructions or data structures that can be accessed, read and executed by an appropriate processor. Such computer-readable media can be any available media that can be accessed by the processor in, or in communication with, the monitored communication link. By way of example, and not limitation, such computer-readable media can comprise RAM, ROM, EEPROM, CD-ROM, flash drives, data memory cards or other analog or digital data storage device that can be used to carry or store desired program elements or steps in the form of accessible computer-executable instructions or data structures. When information is transferred or provided over a network or another communications connection the receiving processor properly views the connection as a computer-readable medium. Thus, any such connection is properly termed a computer-readable medium. Combinations of the above should also be included within the scope of the computer-readable media for the purposes of this disclosure.

Computer-executable instructions include, for example, non-transitory instructions and data that can be executed and accessed respectively to cause a processor to perform certain of the above-specified functions, individually, or in combination. Computer-executable instructions also include program modules that are remotely stored for access by a processor that are caused to communicate in a network environment. The exemplary depicted sequence of executable instructions or associated data structures represents one example of a corresponding sequence of acts for implementing the functions described in the steps. The steps of the exemplary methods, as depicted, are not intended to imply any particular order to the depicted steps except as may be necessarily inferred when one of the depicted steps is a necessary precedential condition to accomplishing another of the depicted steps.

Although the above description may contain specific details, they should not be construed as limiting the claims in any way. Other configurations of the described embodiments of the disclosed systems and methods are part of the scope of this disclosure. Accordingly, the appended claims and their legal equivalents should only define the disclosure, rather than any specific examples given.

We claim:

1. A method for triggering re-beamforming, comprising:
   storing in a data storage device a first signal strength threshold;
   monitoring a plurality of data packets transmitted across a communication link, wherein the communication link is a 60 GHz communication link;
   recording a signal strength value for each of the plurality of data packets;
   calculating, with a processor, a change in the recorded signal strength value between data packets, wherein the change in the recorded signal strength between data packets is based on calculating a difference in the recorded signal strength between consecutive data packets;
   comparing, with the processor, the calculated change in the recorded signal strength between data packets with the first signal strength threshold; and
   when the calculated change in the recorded signal strength is less than the first signal strength threshold then triggering re-beamforming to establish a stronger communication path;
   wherein the calculating of the change in the recorded signal strength between consecutive data packets is executed N times, where N is an integer greater than 1, and
   wherein the re-beamforming is triggered only after the comparing of the calculated change in the recorded signal strength between consecutive data packets falls below the first signal strength threshold for a pair of consecutive data packets;
   after triggering re-beamforming to establish a stronger communication path determining if the first signal strength threshold needs to be changed;
   wherein the first signal strength threshold is a first threshold that is based on an unacceptable change in signal strength between consecutive data packets;
   in response to the determining that the first signal strength threshold needs to be changed then storing a second signal strength threshold;
   continuing the steps of measuring, recording, calculating, comparing, and triggering re-beamforming until packet transmission is complete.

2. The method of claim 1, wherein the first signal strength threshold is predetermined.

3. The method of claim 1, wherein the first signal strength threshold and parameter N are adjustable.

4. The method of claim 3, further comprising:
   monitoring at least one of packet error rate and another communication link transmission/reception quality parameter; and
   adjusting the first signal strength threshold or the parameter N based on a result of the monitoring.

5. The method of claim 4, wherein the adjusting of the first signal strength threshold or the parameter N is automated.

6. The method of claim 1, wherein:
   the calculating of the change in the recorded signal strength between data packets comprises calculating of the change in the recorded signal strength across the number of data packets M, where M is an integer greater than 1, and
   the change in signal strength threshold is a second threshold that is based on an unacceptable change in signal strength across the M number of data packets.

7. The method of claim 6, wherein the second threshold and parameter M are adjustable.

8. The method of claim 7, further comprising:
   monitoring at least one of packet error rate and another communication link transmission quality parameter; and
   adjusting at least one of the second threshold and the parameter M based on a result of the monitoring.

9. The method of claim 8, wherein the adjusting of the at least one of the second threshold and the parameter M is automated.

10. A system for triggering re-beamforming, comprising:
at least one external data communication device that monitors a plurality of data packets transmitted across a communication link, wherein the communication link is a 60 GHz communication link;
a signal strength evaluation device that records a signal strength value for each of the plurality of data packets;
a processor that is programmed to calculate a change in the recorded signal strength (RSS) values between data packets and to compare the calculated change in the RSS between data packets with a signal strength threshold (SST) to determine whether re-beamforming is needed in the communication link;
at least one data storage device storing the SST, wherein the SST is a first threshold that is based on a change in signal strength between consecutive data packets; and
a data output device that outputs a signal to trigger re-beamforming in the communication link when the processor determines that re-beamforming is needed to establish a stronger communication path;
wherein the processor calculates the change in the RSS between consecutive data packets is executed N times, where N is an integer greater than 1;
wherein the processor determines that re-beamforming is needed only when the calculated change in the RSS falls below the first threshold;
wherein the processor is further programmed, after triggering re-beamforming to establish a stronger communication path, to determine if the signal strength threshold needs to be changed;
wherein the processor is further programmed to repeat the steps of measuring, recording, calculating, comparing, and triggering re-beamforming until packet transmission is complete.

11. The system of claim 10, wherein the first threshold and parameter N are adjustable and the adjustment is at least one of automated and based on input from a user via a user interface.

12. The system of claim 10, wherein:
the processor calculates the change in the recorded signal strength between data packets across a number of data packets M, where M is an integer greater than 1,
the change in signal strength threshold is a second threshold that is based on an unacceptable change in signal strength across the M number of data packets, and
the processor determines that re-beamforming is needed after the comparing of the calculated change in recorded signal strength across M data packets falls below the second threshold.

13. The system of claim 12, wherein the second threshold and parameter M are adjustable and the adjustment is at least one of automated and based on input from a user via a user interface.

14. A non-transitory computer-readable medium storing computer-readable instructions which, when executed by a processor, cause the processor to execute the method of claim 8.

* * * * *